(No Model.)
E. R. KNORR.
METHOD OF MEASURING DISTANCES AND LENGTHS ON CHARTS AND DRAWINGS DISTORTED BY DISPROPORTIONATE CONTRACTION, AND OF PROVIDING FOR THEIR CORRECT REPUBLICATION.
No. 317,801.    Patented May 12, 1885.
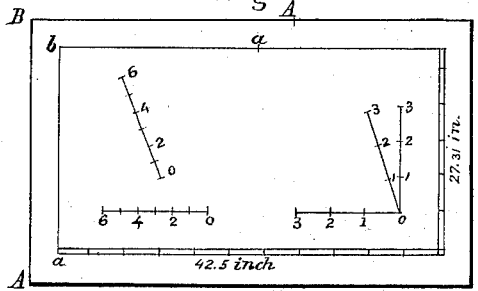
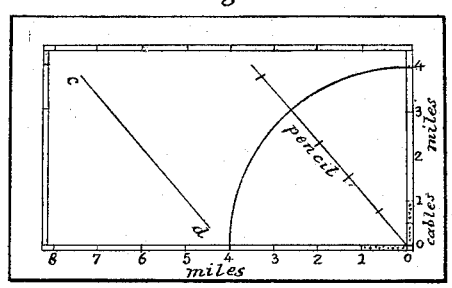
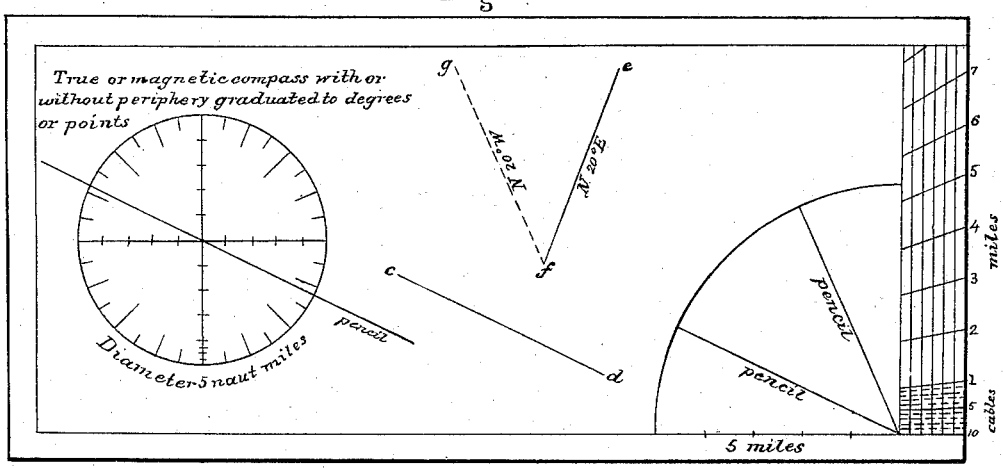
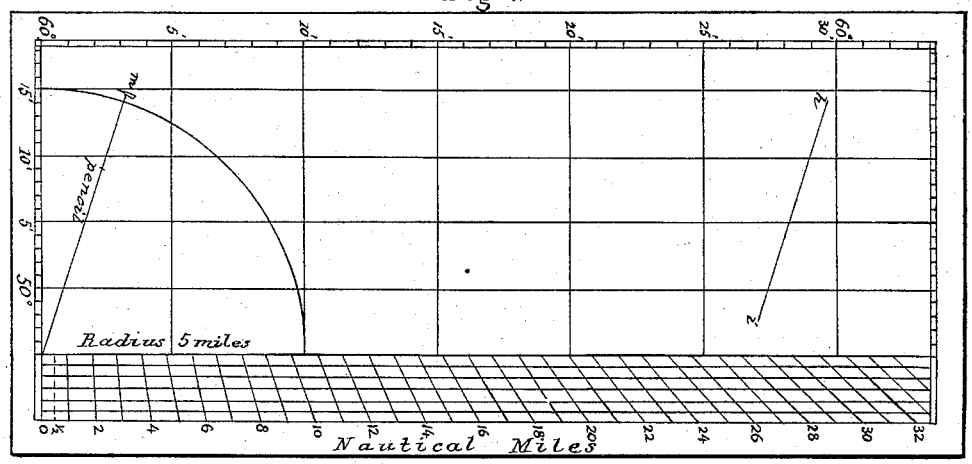
Witnesses
Inventor
Ernest Rudolph Knorr

UNITED STATES PATENT OFFICE.

ERNEST RUDOLPH KNORR, OF WASHINGTON, DISTRICT OF COLUMBIA.

METHOD OF MEASURING DISTANCES AND LENGTHS ON CHARTS AND DRAWINGS DISTORTED BY DISPROPORTIONATE CONTRACTION, AND OF PROVIDING FOR THEIR CORRECT REPUBLICATION.

SPECIFICATION forming part of Letters Patent No. 317,801, dated May 12, 1885.

Application filed January 28, 1885. (No specimens.)

*To all whom it may concern:*

Be it known that I, ERNEST RUDOLPH KNORR, a citizen of the United States, residing at Washington, in the District of Columbia, have invented and produced a new and original device and process for measuring correctly lengths and distances on charts and any other drawings printed on paper, which has during and after the printing distorted unproportionally, of which the following is a specification, reference being had to the accompanying drawings, forming a part thereof.

It is known to experts that charts and all other drawings printed from a copper or steel plate, or from a stone, are hardly ever exact representations of the engraving on the plate or stone. The paper first expands when moist or while being printed, and then contracts unevenly. It contracts in length more than proportionally in breadth, or vice versa, according to the direction in which the plate or stone is placed under the press, and to the direction of the fiber of the paper, and thus renders the scale, as shown on the printed chart or drawing, incorrect in every direction, except in that of the length of the scale, the default increasing with the angle between the latter and the line to be measured, and exceeding sometimes one inch in forty inches. This defect in printed charts and drawings is, moreover, subject to changes by temperature and moisture to which they may be exposed.

To be able to ascertain at any moment the amount of the defect, so as to make a correct republication possible, and to measure lengths and distances on the distorted chart or drawing in any direction correctly is the purport of my invention. It will be effected in the following different manners, Figures 1, 2, 3, and 4 of the drawings illustrating different methods of carrying out my invention.

First. By engraving on the plate or stone of charts or drawings, or by stating in the catalogues of such the exact dimensions on the plate between the corresponding (upper and lower and right and left) inner, outer, or center border lines of the chart or drawing, or the lengths of any lines at an angle to each other in any linear measure; or by marking off the length of the shorter border-line on the corresponding longer one; or by engraving the scale of the chart or drawing on two adjoining borders; or by engraving two or more scales of the same unit of measure at a right or any other angle to each other at any place of the chart or drawing, all this as shown, respectively, in Figs. 1 and 2, and for the purpose of establishing the defect of the printed chart caused by its unproportional expansion or contraction, for its correct republication, and for direct measurements, or for the computation of the corrections to be applied to distances measured on the scale or on the scales of the chart or drawing as engraved on the plate or stone.

Second. By engraving on the plate or stone of charts or drawings a circle or a part of a circle of a radius measuring an expressed number of units of the scale of the charts or drawings engraved either on one, two, or all four borders of the charts or drawings, or elsewhere on them, for the purpose that the radii or diameters of the circle, either graduated on the plate or to be graduated on the chart, according to their expressed length when measurements are to be made, may serve as scales for distances in their respective directions; or by engraving only radii or diameters of a circle or parts of such, graduated or to be graduated, as aforesaid, for the same purpose; or in constituting the lines of bearing of the compass of a chart-scales of the same, either graduated or to be graduated, as aforesaid, by expressing their uniform length by the scale of the chart on the plate or stone, all this as shown, respectively, in Figs. 2 and 3. These devices are for the purpose of ascertaining distances directly without additional computation. The circle or arc and its radii and diameters, as also the lines of bearing of the compass and the scales, will expand or contract on the paper in proportion with the aggregate expansion or contraction of the entire printed chart or drawing. The radii, diameters, lines of bearing, and the units of the scale, which will be on the plate of equal length, will differ in length on the printed chart or drawing, and each line, divided into the same number of units, will be a scale for all lengths and distances in its respective directions. In order to measure line *c d* in Fig. 2, refer it by a parallel ruler to the radius of the engraved arc parallel to it, as shown in the same figure, or to the radius or diameter of the compass constituted as a scale, as shown in Fig. 3. Draw it there in pencil, if it does not coincide with an engraved line, and divide that radius or diameter into its expressed units, which then will be a scale in that direction. When a line cannot be referred directly to a radius or diameter, owing to its direction—as, for instance, line $e\,f$ in Fig. 3—the corresponding line, $g\,f$, under the same angle with a border-line, (or for charts on which the north and south line of the compass is parallel to a border-line, the corresponding line in the adjoining quadrant,) must be referred instead of it. The radii or diameters to serve thus as scales should not exceed in length six or seven inches, so that they may readily be taken into ordinary dividers.

Third. A proportional scale may be engraved on any one of the borders or in any other place of the chart or drawing, as shown in Fig. 3, on which distances can be measured directly without the necessity of graduating the radius or diameter to which the distance has to be referred. The process is as follows: Take the radius or diameter into the dividers and see which of the lines of the proportional scale contains the same length between the same number of units. On that line measure your distance.

Fourth. Fig. 4 represents a chart with a Mercator's projection, on which the linear length of a minute of the meridian (generally taken by the navigator for that of a nautical mile) increases with the latitude. In measuring distances by the proportional scale above described this increase must be taken into account, as follows: See how much the linear length of the radius in minutes of latitude, as drawn, is longer or shorter than an equal number of minutes on the border-scale of latitude abreast of the line to be measured, and add the difference to or deduct it from the radius before you refer the latter to the proportional scale. For instance, in Fig. 4 add the distance from $m$ to the arc (which is the excess of the linear length from latitude 60° 23' to 60° 33' over that from 60° 00' to 60° 10') and enter the proportional scale with the entire length from $m$ to the corner-point.

Having fully described my invention, what I desire to claim, and to secure by Letters Patent, is—

1. The method of ascertaining from a chart or drawing the relative shrinkages of the paper on which the chart or drawing is printed from a plate or stone, which consists in printing or otherwise placing upon the said chart or drawing symbols, measurements, or other directions for that purpose, substantially as described.

2. The method of ascertaining the length of the border-lines of a chart or drawing as engraved or drawn on a plate or stone, and of providing thereby for the correct republication of the chart or drawing, or for the correct measurement of lengths and distances on the chart or drawing after the disproportionate expansion or contraction of the paper on which it is printed, which consists in printing and publishing the linear dimensions between the opposite corresponding border or neat lines of a chart or drawing as measured on the plate or stone, for the stated purposes, substantially as described.

3. The method of ascertaining the length of the border-lines of a chart or drawing as engraved or drawn on the plate or stone, and of providing thereby for the correct republication of the chart or drawing, or for the correct measurement of lengths and distances on the chart or drawing after the disproportionate expansion or contraction of the paper on which it is printed, which consists, first, in engraving or drawing on the plate or stone the linear dimensions of a chart or drawing between any of the corresponding border or neat lines or the lengths of any lines at an angle to each other in any units of measure and fractions thereof, if there are such, as measured on the plate or stone, and then printing and transferring the same to the paper, chart, or drawing in the act of printing the chart or drawing, as specified.

4. The method of ascertaining the correct proportion of length and breadth within the border-lines of a chart or drawing printed from a plate or stone corresponding to that on the plate or stone, for the purpose of a correct republication of the chart or drawing, or of providing for correct measurements on it after the disproportionate expansion or contraction of the paper on which it is printed, which consists in engraving on the plates or stones of charts or drawings two or more scales of the same unit of linear measure at a right or other angle to each other, substantially as and for the purposes set forth.

5. The method of securing correct measurements on charts or drawings printed from plates or stones after the disproportionate expansion or contraction of the paper on which they are printed, which consists in engraving on the plates or stones a circle or any part of such, for the purpose that the radii or diameters of this circle may be used either directly as proportional scales for the distorted chart or drawing, or as indicators of the respective line of a proportional scale engraved elsewhere on the plate or stone, substantially as specified.

6. The method of securing correct measurements on charts printed from a plate or stone after the disproportionate expansion or contraction of the paper on which they are printed, which consists in constituting the lines of bearing of the compass of the chart scales for the chart in their respective directions or indicators of the respective lines of a proportional scale engraved elsewhere on a plate or stone, substantially as specified.

ERNEST RUDOLPH KNORR.

Witnesses:
Q. A. PEARSON,
D. RITTENHOUSE.